INVENTOR.
LORENZO P. JONCAS

INVENTOR.
LORENZO P. JONCAS 3,322,250
CLUTCH SHIFTING COLLAR
Lorenzo P. Joncas, Sherbrooke, Quebec, Canada, assignor to Canadian Ingersoll-Rand Company Limited, Montreal, Quebec, Canada, a corporation of Canada
Filed Sept. 17, 1965, Ser. No. 488,034
8 Claims. (Cl. 192—98)

This invention relates to clutch mechanisms and more particularly to clutch shifting collars for transmitting movement from a clutch control apparatus to a slidable clutch jaw.

Conventionally, a clutch shifting collar of the type employed with heavy machinery, such as a drum hoist, is provided with wearing rings which are fixedly secured to the opposing side faces of the clutch shifting collar by a plurality of studs passing through drilled and tapped holes therein. For instance, in one conventional form of clutch shifting collar, twelve holes are drilled and tapped in each of the faces of the collar to receive brass studs for securing the wearing rings to the collar. This construction of the attachment of the wearing rings to the clutch shifting collar is, however, undesirable due to the relatively large expense in time and money necessary for the drilling and tapping of the holes in the collar and the location of the studs therein.

The principal object of the present invention is to provide a new and improved clutch shifting collar which is constructed and arranged such that its wearing rings are secured thereto in a simple and economical manner without the necessity for drilling and tapping holes in the clutch shifting collar.

Other objects and advantages of the invention will be apparent from the following description taken in connection with the accompanying drawings. It will be understood that changes may be made in the details of construction and arrangement of parts shown and described without departing from either the spirit or the scope of the present invention as the preferred form of the invention has been given by way of illustration only.

Referring to the drawings.

Figure 1:
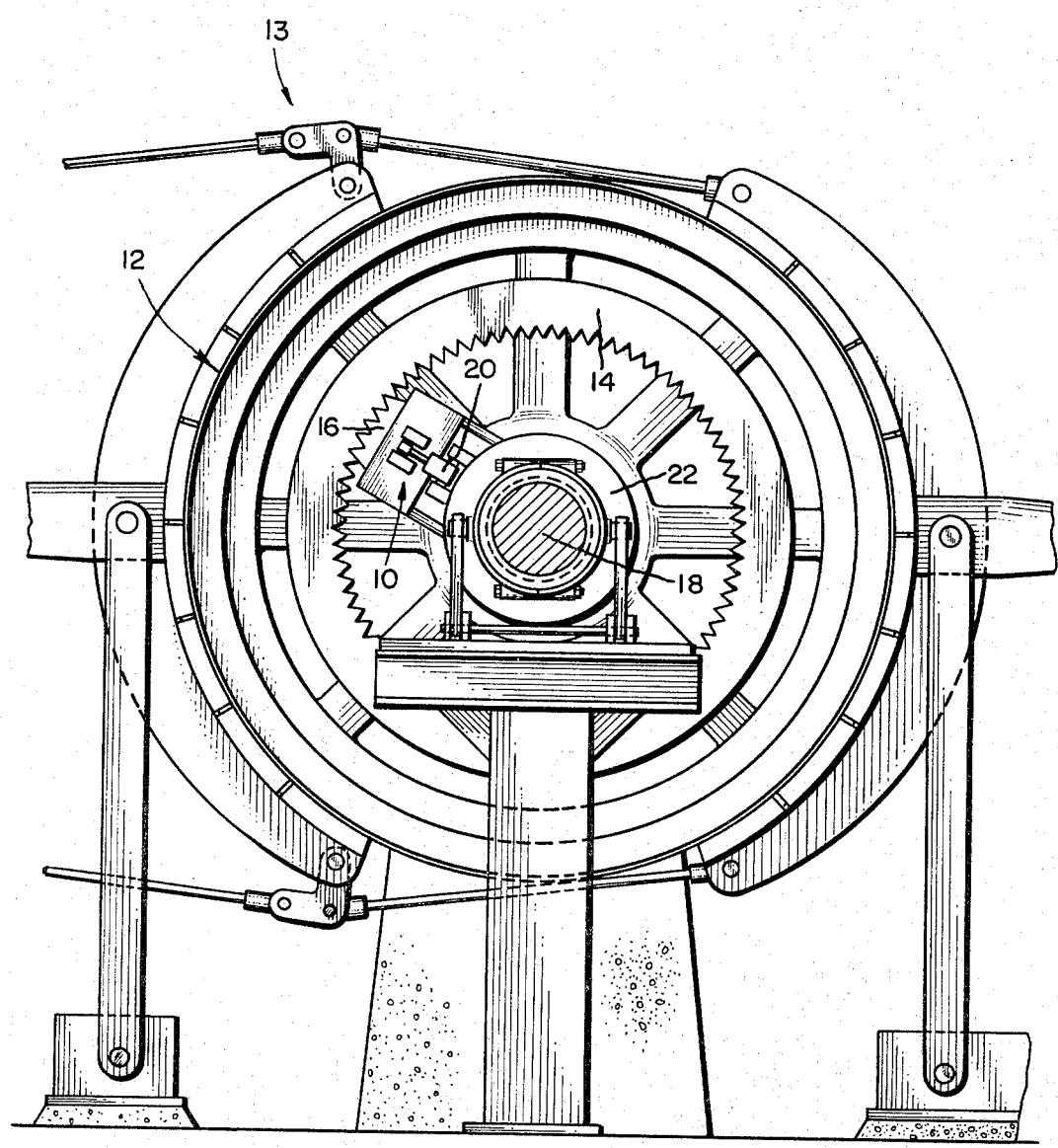
FIG. 1 is an elevational sectional view of an embodiment of the invention in combination with an internal expanding jaw type clutch employed on a hoist drum.

Referring more particularly to the drawings wherein similar reference characters designate corresponding parts throughout the several views, FIG. 1 illustrates an internal-expanding jaw type clutch designated generally at 10 which is employed upon a hoist drum 12 having a braking apparatus 13. The clutch 10 comprises an annular clutch jaw 14 fixedly carried by the hoist drum 12 and a radial clutch jaw 16 movable into driving engagement with the annual clutch jaw 14 to rotate the hoist drum 12.

The radial clutch jaw 16, more specifically, is carried by a rotatably journalled shaft 18 for rotation therewith and is radially slidable relative to the annular clutch jaw 14 upon the movement of a toggle mechanism 20 which is pivotally connected to the radial clutch jaw 16 and fixedly connected to a sleeve 22 carried by the shaft 18. The sleeve 22 is carried by the shaft 18 for rotation therewith and axial slidable movement thereon to displace the toggle mechanism 20 and urge the radial clutch jaw 16 into and out of driving engagement with the annular clutch jaw 14.

Figure 2:
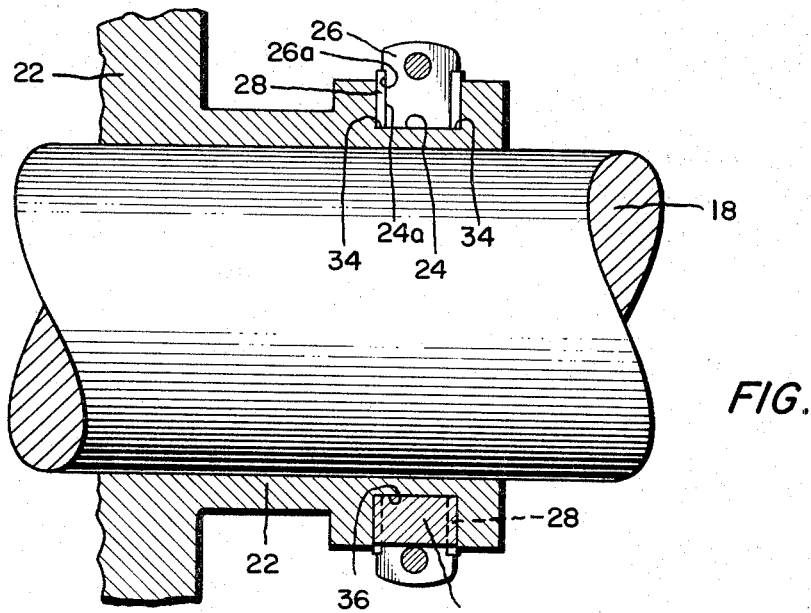
FIG. 2 is an enlarged elevational sectional view showing the clutch shifting collar illustrated in FIG. 1.
Figure 3:
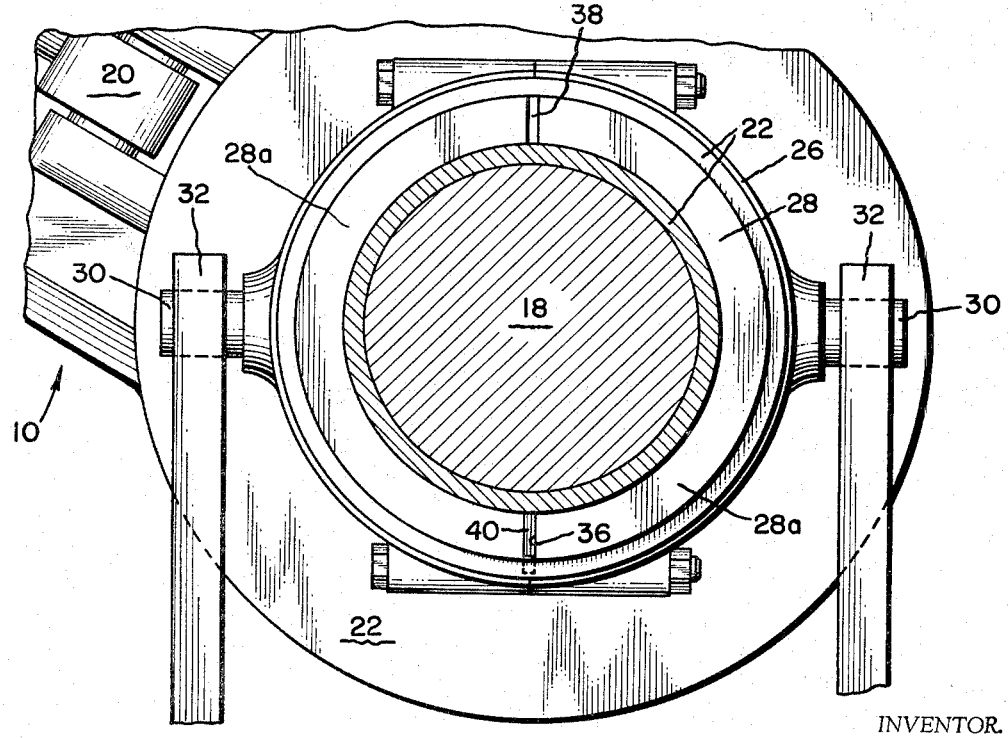
FIG. 3 is an enlarged elevational end view showing the clutch shifting collar illustrated in FIGS. 1 and 2.

As will be seen from FIG. 2, the sleeve 22 is formed to include a circumferential annular slot 24 which is adapted to receive a clutch shifting collar 26. The clutch shifting collar 26 is provided with a wearing ring 28 intermediate each of its side faces 26a and the walls 24a of the annular slot 24, the wearing rings 28 being secured within the annular slot 24 in a manner to be hereinafter more specifically described. The wearing rings 28 are carried in the slot 24 in a running fit with the sleeve 22 to permit rotation of the sleeve 22 independently of the wearing rings 28 and the clutch shifting collar 26.

The clutch shifting collar 26, furthermore, carries a plurality of diametrically opposed, outwardly extending connecting arms 30 which are each connected to an operating lever 32. The operating levers 32 are operatively connected to the clutch control apparatus (not shown) for pivotal movement in response to the actuation of the clutch control apparatus.

In the operation of the clutch 10, actuation of the clutch control apparatus effects pivotal movement of the operating levers 32 to slide the sleeve 22 axially upon the shaft 18. This sliding movement of the sleeve 22, in turn, displaces the toggle mechanism 20 to urge the radial clutch jaw 16 into and out of driving engagement with the annular clutch jaw 14 on the hoist drum 12. Rotation of the shaft 18, while effecting conjoined rotation of the radial clutch member 16 and the sleeve 22, is, however, independent of the clutch shifting collar 26 and the wearing rings 28 due to the running clearances between the wearing rings 28 and the sleeve 22.

In accordance with the present invention, each of the wearing rings 28 is secured intermediate one of the side faces 26a of the clutch shifting collar 26 and one of the walls 24a of the annular slot 24 without drilling, tapping, or stud driving into the clutch shifting collar 26. More specifically, as will be seen from FIG. 2, each of the side faces 26a of the clutch shifting collar 26 is provided with an annular groove 34 which, with the clutch shifting collar 26 disposed in the annular slot 24, is substantially completely enclosed by a wall 24a of the annular slot 24 and the clutch shifting collar 26. A transverse slot 36 is formed through the clutch shifting collar 26 across the annular slot 24 in radially spaced relationship to the outer circumference of the clutch shifting collar 26.

Each of the wearing rings 28 is formed from a pair of arcuate or ring segments 28a which are located in opposed relationship within one of the annular grooves 34. One of the slots or end gaps 38 between the ring segments 28a of each of the wearing rings 28 is aligned with the transverse slot 36 through the clutch shifting collar 26. A plate 40 is located through the aligned end gaps 38 and the transverse slot 36 to key the ring segments 28a to the clutch shifting collar 26.

From the foregoing it will be seen that the ring segments 28a which form the wearing rings 28 are entrapped intermediate the clutch shifting collar 26 and the walls 24a of the annular slot 24 in the sleeve 22 to be retained thereby in operative relation to the clutch shifting collar 26. Rotation of the ring segments 28a is, however, prevented by the running fit between the wearing rings 28 and the sleeve 22 and the plate 40 which keys the ring segments 28a to the clutch shifting collar 26. Thus, it will be seen that I have provided a new and improved clutch shifting collar 26 which is constructed and arranged such that its wearing rings 28 are secured thereto in a simple and economical manner without the necessity for drilling and tapping holes in the clutch shifting collar 26.

The operation of the invention is believed to be apparent from the foregoing description.

From the foregoing it will be seen that I have provided new and improved means for accomplishing all of the objects and advantages of my invention.

Having thus described my invtention, I claim:

1. In combination with a clutch mechanism including a rotatable shaft, a first clutch member adjacent said shaft, a second clutch member operatively connected to said shaft for movement into driving engagement with said first clutch member, and a sleeve having an annular slot therein slidable upon said shaft to move said second clutch member into driving engagement with said first clutch member; the combination of:
   a collar within said annular slot in said sleeve and having a groove in at least one of its opposing sides communicating with said annular slot;
   said collar cooperating with a wall of said annular slot to enclose said groove within said annular slot;
   a wearing ring disposed within said groove intermediate said collar and such wall of said annular slot;
   said collar and said wearing ring including mating transverse slots; and
   plate means disposed in said mating slots for connecting said wearing ring to said collar.

2. In combination with a clutch mechanism including a rotatable shaft, a first clutch member adjacent said shaft, a second clutch member operatively connected to said shaft for movement into driving engagement with said first clutch member, and a sleeve having an annular slot therein slidable upon said shaft to move said second clutch member into driving engagement with said first clutch member; the combination of:
   a collar within said annular slot in said sleeve having a groove in each of its opposing sides communicating with said annular slot;
   said collar cooperating with the walls of said annular slot to enclose each of said grooves within said annular slot;
   a wearing ring disposed within each of said grooves intermediate said collar and the walls of said annular slot;
   said collar and said wearing rings including mating transverse slots; and
   plate means disposed in said mating slots for connecting said wearing rings to said collar.

3. In combination with a clutch mechanism including a rotatable shaft, a first clutch member adjacent said shaft, a second clutch member operatively connected to said shaft for movement into driving engagement with said first clutch member, and a sleeve having an annular slot therein slidable upon said shaft to move said second clutch member into driving engagement with said first clutch member; the combination of:
   a collar within said annular slot in said sleeve having a groove in each of its opposing sides communicating with said annular slot;
   said collar cooperating with the walls of said annual slot to enclose each of said grooves within said annular slot; and
   a wearing ring including a plurality of arcuate segments disposed within each of said grooves intermediate said collar and the walls of said annular slot.

4. In combination with a clutch mechanism including a rotatable shaft, a first clutch member adjacent said shaft, a second clutch member operatively connected to said shaft for movement into driving engagement with said first clutch member, and a sleeve having an annular slot therein slidable upon said shaft to move said second clutch member into driving engagement with said first clutch member; the combination of:
   a collar within said annular slot in said sleeve having a groove in each of its opposing sides communicating with said annular slot;
   said collar cooperating with the walls of said annular slot to enclose each of said grooves within said annular slot;
   a wearing ring including a plurality of arcuate segments disposed within each of said grooves intermediate said collar and the walls of said annular slot; and
   key means operatively connecting said wearing rings to said collar.

5. In combination with a clutch mechanism including a rotatable shaft, a first clutch member adjacent said shaft, a second clutch member operatively connected to said shaft for movement into driving engagement with said first clutch member, and a sleeve having an annular slot therein slidable upon said shaft to move said second clutch member into driving engagement with said first clutch member; the combination of:
   a collar within said annular slot in said sleeve having a groove in each of its opposing sides communicating with said annular slot, said collar having a transverse slot therethrough;
   said collar cooperating with the walls of said annular slot to enclose each of said grooves within said annular slot;
   a wearing ring including a plurality of arcuate segments disposed within each of said grooves intermediate said collar and the walls of said annular slot; and
   key means through said transverse slot in said collar and said annular grooves cooperating with the arcuate segments of said wearing rings to key said wearing rings to said collar.

6. An apparatus according to claim 1, further comprising:
   said wearing ring including a plurality of separate arcuate segments; and
   said plate means extending intermediate two of said arcuate segments.

7. An apparatus according to claim 2, further comprising:
   said plate means comprising a single plate.

8. An apparatus according to claim 7, further comprising:
   said wearing rings each including a plurality of separate arcuate segments; and
   said plate extending intermediate two of the arcuate segments of each of said wearing rings.

References Cited

UNITED STATES PATENTS

| 1,751,809 | 3/1930 | Glisch | 192—99 X |
| 2,046,916 | 7/1936 | Kieffer | 192—98 |
| 3,124,867 | 3/1964 | Schick | 192—98 X |

MARK NEWMAN, *Primary Examiner.*

ARTHUR T. McKEON *Examiner.*